(12) United States Patent
Leipelt et al.

(10) Patent No.: US 6,435,152 B1
(45) Date of Patent: Aug. 20, 2002

(54) INDUCTION DEVICE FOR AN INTERNAL COMBUSTION ENGINE

(75) Inventors: Rudolf Leipelt, Marbach; Holger Paffrath, Ludwigsburg, both of (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/763,184
(22) PCT Filed: Aug. 11, 1999
(86) PCT No.: PCT/EP99/05907
§ 371 (c)(1), (2), (4) Date: Apr. 20, 2001
(87) PCT Pub. No.: WO00/11332
PCT Pub. Date: Mar. 2, 2000
(51) Int. Cl.$^7$ ............................................. F02M 35/10
(52) U.S. Cl. .................................................. 123/184.55
(58) Field of Search ........................ 123/184.55, 184.53, 123/184.57, 184.56, 184.31

(56) References Cited

FOREIGN PATENT DOCUMENTS

| DE | 38 43 690 A1 | * | 7/1990 | ............ 123/184.55 |
| EP | 0 848 145 A2 | * | 6/1998 | |

* cited by examiner

Primary Examiner—Gene Mancene
Assistant Examiner—Hyder Ali
(74) Attorney, Agent, or Firm—Crowell & Moring LLP

(57) ABSTRACT

An induction device for an internal combustion engine with an intake pipe having dimensions which can be varied within predetermined limits. The intake pipe is made up of at least one resonance pipe (R) coupled via a resonance volume (43) with at least one ram pipe (S) leading to an inlet of a respective cylinder of the engine. A supercharging of the resonance pipe and/or the ram pipe can be realized in the entire intake pipe, and the dimensions of resonance pipes (R) and the ram pipes (S) can be continuously varied within predetermined limits.

19 Claims, 6 Drawing Sheets

INDUCTION DEVICE FOR AN INTERNAL COMBUSTION ENGINE

STATE OF THE ART

Figure 1:
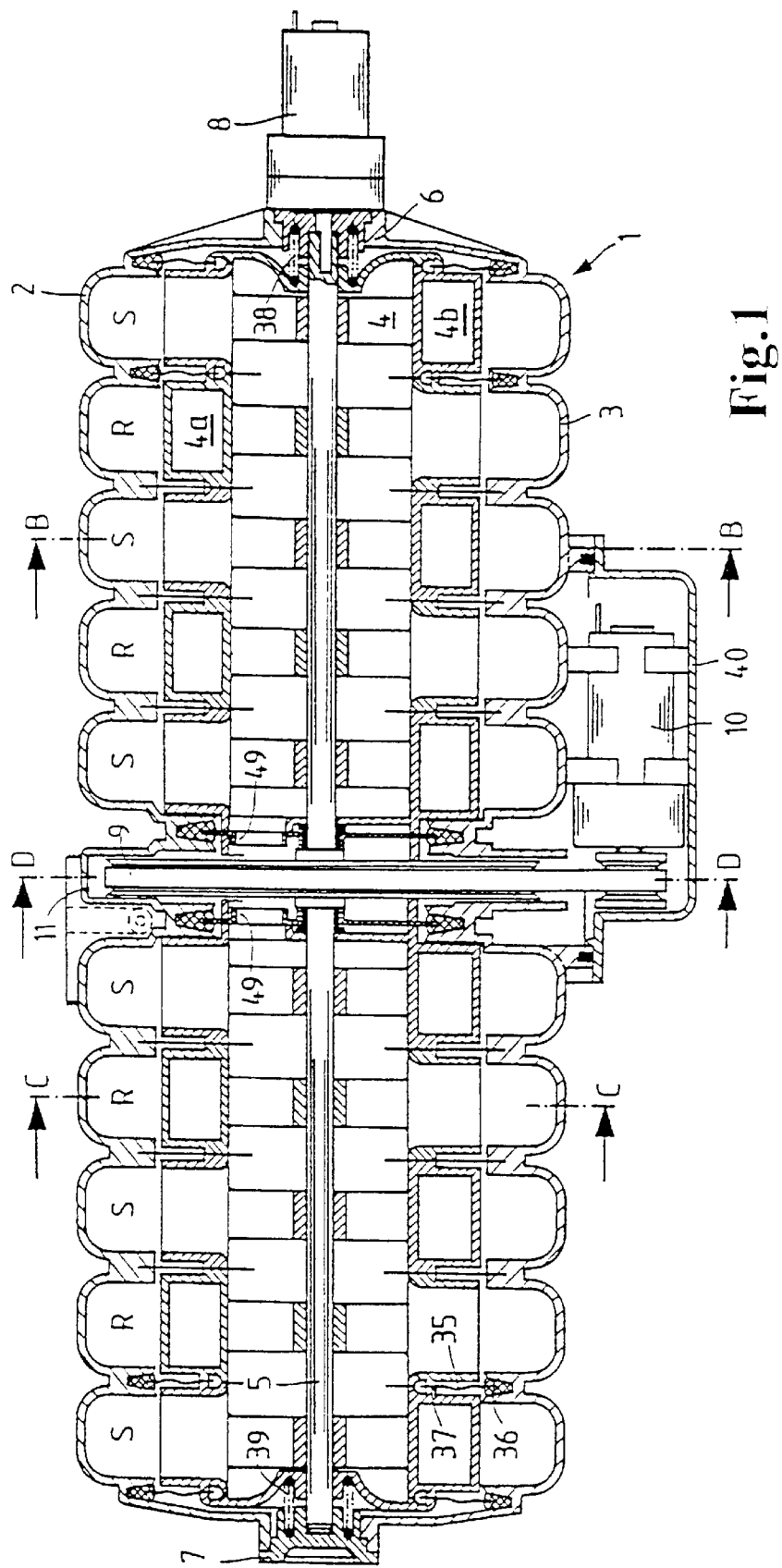

The invention relates to an induction device for an internal combustion engine in accordance with the preamble of the main claim.

Such an induction device is disclosed, for instance, in published German Application No. 39 21 081. This known induction device with an intake pipe arrangement for a multicylinder internal combustion engine has a cylindrical intake manifold chamber and individual intake pipes leading to the individual cylinders which are extended around the intake manifold chamber and are arranged side by side in longitudinal direction thereof. To obtain two different ram pipe lengths, each individual intake pipe communicates with the intake manifold chamber via two control openings spaced apart at a given angle in the circumferential wall of the intake manifold chamber.

In the intake manifold chamber of this known induction device, a tubular rotary slide valve is arranged, which has at least one control slit for each intake pipe. When the rotary slide valve is in one end position, this control slit communicates with the first opening, while the other opening is covered by the wall of the rotary slide valve. This creates a long ram tube length. If the rotary slide valve is rotated to its other end position, the first opening is covered by the wall of the rotary slide valve and the control slit communicates with the second opening, so that a short ram pipe length is obtained.

A disadvantage of this known device is that it does not permit a continuously variable adjustment of the ram pipe length. This means that an optimal performance output is possible only within two narrowly limited rotational speed ranges of the internal combustion engine. The known devices thus always relate only to length-adjustable ram induction systems.

EP 0 848 145 A2 further discloses a continuously variable adjustment of the resonance tube length in the induction system for a V-type internal combustion engine. This arrangement provides for a drum as the rotary slide valve in which the intake air enters axially and through which the air is conducted into the tangentially adjacent intake pipe. Here, the adjustable length of the effective air intake pipe is simply set by rotating the drum.

Viewed in an of it self, it is also known from . . . (still to be checked . . . ) to effect a changeover between so-called ram charging and resonance charging in the induction device.

OBJECT OF THE INVENTION

Thus it is the object of the invention to provide an induction device that permits a continuously variable adjustment of the intake pipe geometry and can be manufactured simply with a modular construction.

ADVANTAGES OF THE INVENTION

This object is attained by the invention in that a modular intake pipe concept, particularly for multicylinder internal combustion engines, with the features of the characterizing portion of the main claim is advantageously realized in an induction device of the initially described type.

The intake pipe concept according to the invention relates to an induction device with a particularly advantageous changeover between resonance charging and ram charging of the intake air. Here, too, a continuously variable ram pipe adjustment and a continuously variable resonance pipe adjustment are made possible. A stepped resonance pipe cross-section adjustment can also be carried out and switched together with the ram induction system. The exemplary embodiments according to the invention make it advantageously possible to carry out all the adjustment actions with, for instance, only one common actuator. However, partial functions, e.g. resonance pipe cross-section adjustment, can also be carried out by a separate actuator.

The substantial advantages of the intake pipe concept according to the invention are particularly its modular construction, which makes the principle of the induction device suitable, e.g. for 3-, 4- or generally multi-cylinder engines. Furthermore, adjustments of the resonance or ram pipe cross section (e.g. for engines of a family with equal cylinder spacing) are made possible in simple manner by the use according to the invention of adjustment disks with smaller or greater outside diameters.

In further embodiments of the induction device according to the invention with continuously variable pipe lengths, the changeover from resonance charging to ram charging can also be carried out with a different resonance switch.

In the above-described resonance charging systems, the air consumption of the internal combustion engine is advantageously improved within a certain speed range. The reason for the improved performance with ram charging at these engine speeds is that the resonance system and the ram system are only well tuned to one another within a certain range. At other speeds, the less well tuned overall system of resonance and ram pipes causes a deterioration in performance, so that the system switches over to ram charging as described.

According to one embodiment, the changeover can be avoided in that the lengths of the resonance pipe and the ram pipe are optimally tuned to one another at any speed. A resonance charging system can then be used throughout at any operating point of the internal combustion engine. The expense of a special resonance flap is omitted here, and the performance of the engine is even improved, depending on the configuration.

With respect to the ram pipes, a long ram pipe length is more likely to be advantageous at low speeds and a short length at high engine speeds. This relationship is similar in the resonance pipes. The difference between the two pipes is the magnitude of the pipe length and the variable rate of decrease in the pipe length as the rotational speed of the engine increases.

If n is the speed of the internal combustion engine and LS and LR are the lengths of the ram pipe (LS) and the resonance pipe (LR) the following is true for the optimal pipe lengths:

$$LS_{opt} = LS_{max} - KS*(n - n(LS_{max}))$$

and $$LR_{opt} = LR_{max} - KR*(n - n(LR_{max})),$$

where KS and KR are constants for the ram pipes (KS) and resonance pipes (KR) and $n(LS_{max})$ and $n(LR_{max})$ are the associated rotational speeds for the maximum ram pipe length or resonance pipe length. Constants KS and KR may differ, i.e., the pipe lengths of ram pipe and resonance pipe must be decreased by different amounts when the speed increases by a certain amount.

Such resonance charging can be simply realized by a corresponding modification of the above-described illustrative embodiments. If the pipe lengths of the ram pipe and the resonance pipe were wound onto a disk, as it were, the differences in the constants KS and KR could be simply realized by different diameters of the adjustment disk.

If KR is smaller than KS, i.e. if the resonance pipe length does not change as much as the ram pipe length, the difference would be that the adjustment disks of the resonance pipes would me smaller in diameter and the housing for these pipes would be correspondingly reduced to maintain the pipe diameter. If KS were smaller than KR, the situation would be reversed, that is, the disks of the ram pipes would be smaller. In the design of the ram pipe according to one of the above-described embodiments, care must be taken that the axial friction surfaces on the adjustment disks of the ram pipe and the resonance pipe lie on the same radius even if the outside diameters of the adjustment disks differ.

In the latter embodiment, the resonance flap, i.e. the disks with apertures and possibly an iris diaphragm, and thus in principle resonance switching, can be eliminated. Instead, closed walls with a central passage for the shaft would enclose the resonance volume. The design of the intake pipe in the induction device according to the invention would otherwise remain unchanged.

In a further advantageous embodiment of the induction device according to the invention, the design of the housing of the induction device and, in particular, the internal sealing technology is advantageously improved, so that the intake pipe can be manufactured more cost effectively and modularization is promoted.

The induction device is no longer partitioned lengthwise, i.e. in the plane of the rotary axis of the adjustment disks contained in the intake pipe, but perpendicularly thereto. The surrounding housing, similarly to the inner workings, the adjustment disks, is constructed from individual disks. The normally required sealing disks are omitted. Instead, sealing lips are molded onto the adjustment disks, preferably on the exterior part of each of the two-part adjustment disks.

The sealing lips of this embodiment provide a seal between the adjustment disks and the surrounding housing wall, which projects into the intake pipe and assumes the function of the sealing disks. The adjustment disk, or only the part thereof that carries the sealing lip, need not be made of the same material as the housing. The material should take into account the requirements of the sealing lip geometry and the friction relative to the housing. The requirements for dimensional accuracy and axial runout of the adjustment disks are lower in this alternative concept.

The adjustment disks are threaded onto a shaft as before. They are no longer clamped with a spring. At least on the end faces of the housing, end disks with a shaft bearing must be provided. The actuation of the shaft to continuously vary the respective lengths of the pipes is effected as described above.

The housing disks of the latter embodiment are all identical, except for the end pieces, which may have a different design. This is also true for the adjustment disks. The modular construction of the intake pipe is thus considerably simplified. Depending on the number of cylinders of the internal combustion engine and the respective intake pipe concept, a different number of adjustment and housing disks is assembled. Depending on the concept, the individual housing or adjustment disks are all mounted in the same orientation (e.g. in an inline engine with ram charging only) or alternately rotated by, for example, 180° (e.g. in a combination of resonance charging and ram charging). The pipe branches issuing from these housing disks should be completely located within the housing disk. Consequently, the corresponding pipe sections need not be produced by assembling two adjacent housing disks, which considerably simplifies the interconnection of the housing disks.

The housing disks can be simply interconnected by means of the tongue and groove principle. The tongue and groove geometry along the circular periphery remains unchanged. The connection may be made, for instance, as a snap connection, e.g. with a sealing ring, or by welding. Advantageously, the entire intake pipe can be preassembled and prestressed before connecting all the housing disks to the respective adjacent disks by laser welding in a single operation.

To simplify the principle and execution, the intake pipe can be separated from the ram pipe end sections facing the cylinder head, i.e. downstream from the basic intake pipe body. The ram pipe end sections and the basic body are connected, for instance, by means of rubber sleeves. A precollector as described above, if present, or the piping extending thereto, can be connected in similar manner. If no precollector is present, the inflow from the throttle valve into the interior plenum may also occur axially.

The above-described housing constructed from individual disks can be combined with all the other embodiments. The tongue and groove principle works in every case. The possibility of closing one resonance pipe per resonance header by a corresponding embodiment of the exterior resonance pipe wall formed by the housing is feasible and meaningful in this embodiment as well.

These and other features of preferred further embodiments of the invention are set forth in the claims as well as in the description and the drawings. The individual features may be implemented either alone or together in subcombinations in embodiments of the invention or in other fields of use and may represent advantageous embodiments that are protectable per se, for which protection is hereby claimed.

DRAWING

Figure 2:
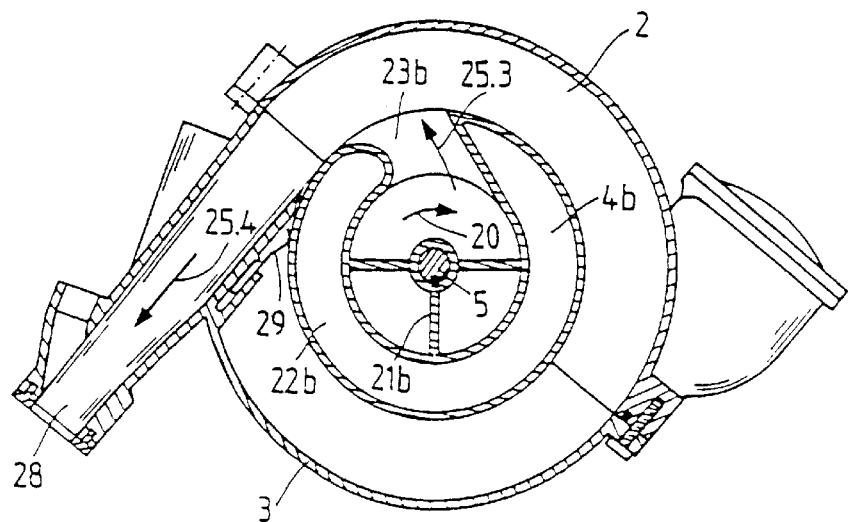
Figure 3:
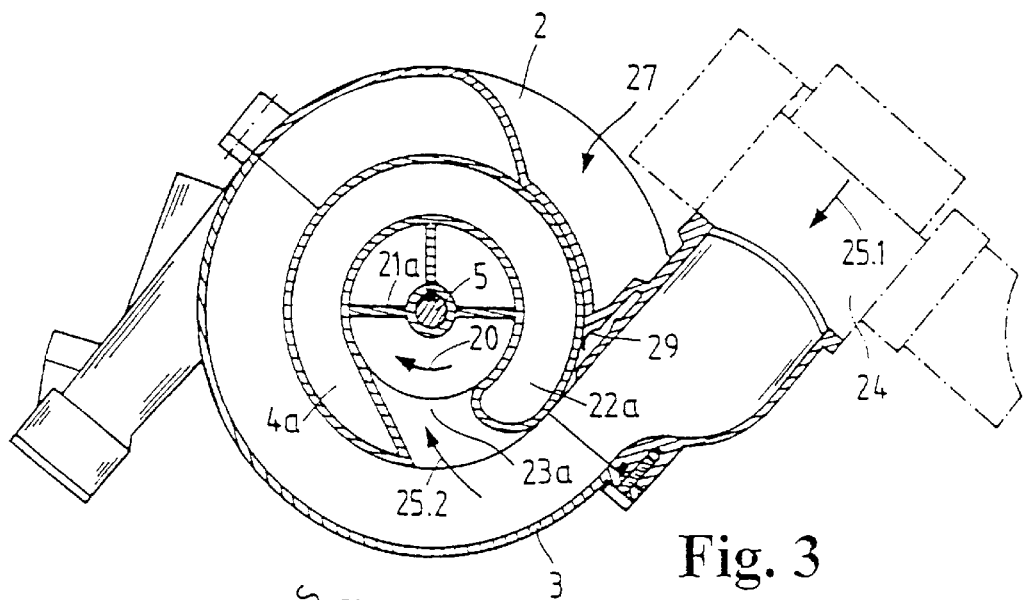
Figure 4:
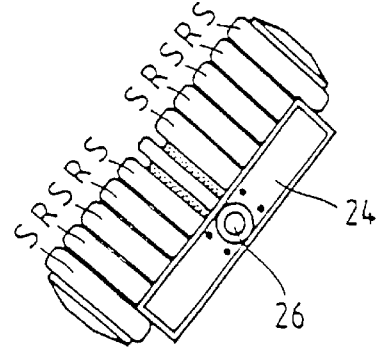
Figure 5:
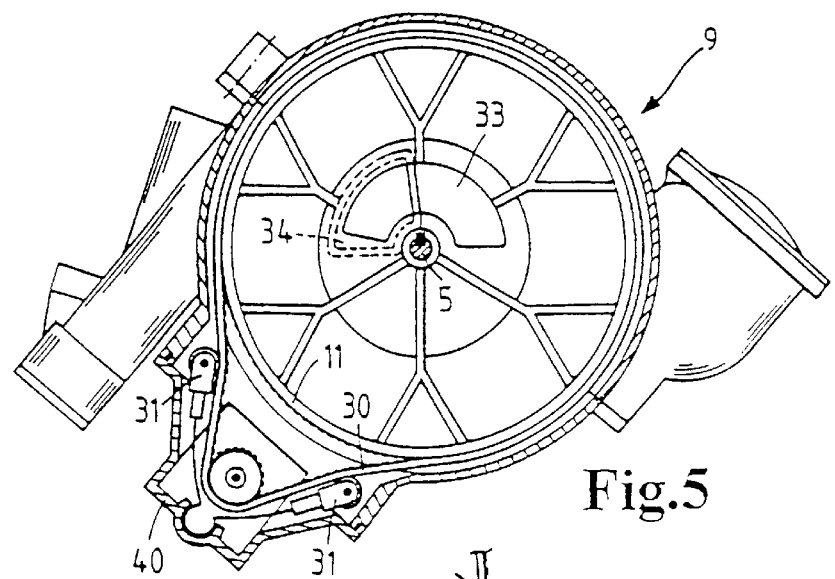
Figure 5A:
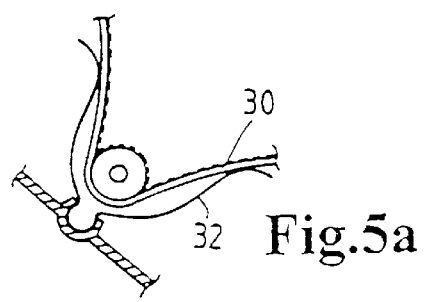

The invention will now be described in greater detail, by way of example, with reference to the embodiments depicted in the drawing in which FIG. 1 is a section through an induction device with a combination of adjustable resonance and ram pipes for a 6-cylinder internal combustion engine, FIG. 2 is a section through a ram pipe along line B—B in FIG. 1, FIG. 3 is a section through a resonance pipe along line C—C in FIG. 1, FIG. 4 is a schematic plan view of the induction device according to FIG. 1 with a precollector for the intake air, FIGS. 5 and 5a show a section through a central drive unit for rotating the adjustment disks to change the ram and resonance pipe lengths and cross-sections and with changeover disks based on the principle of openings rotating past one another and a detail section of a belt tensioner.

Figures 6, 7:
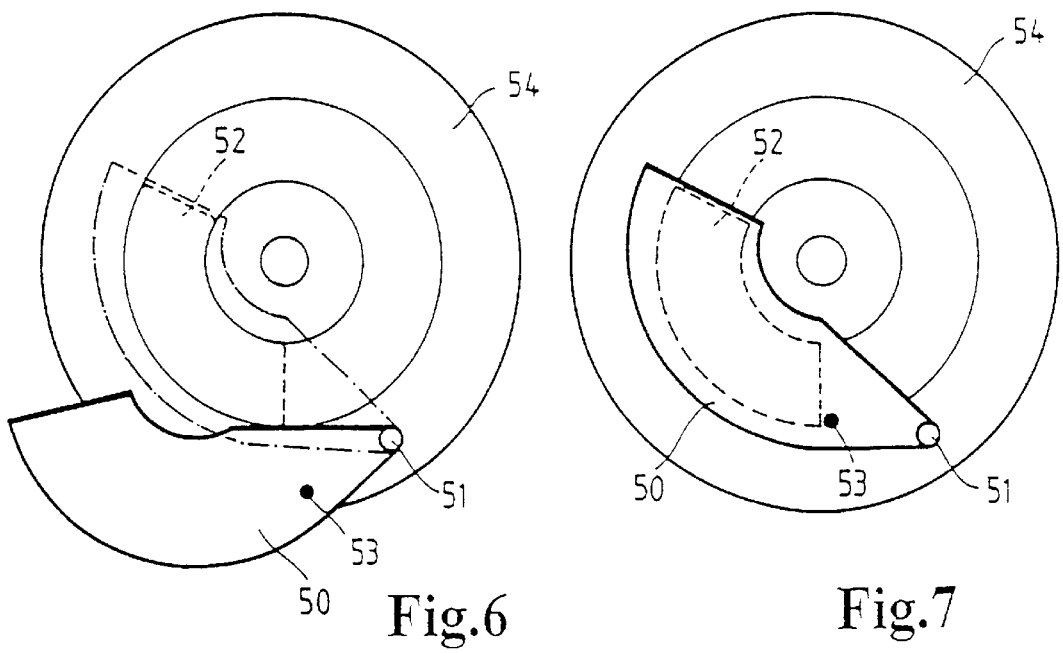
Figure 8:
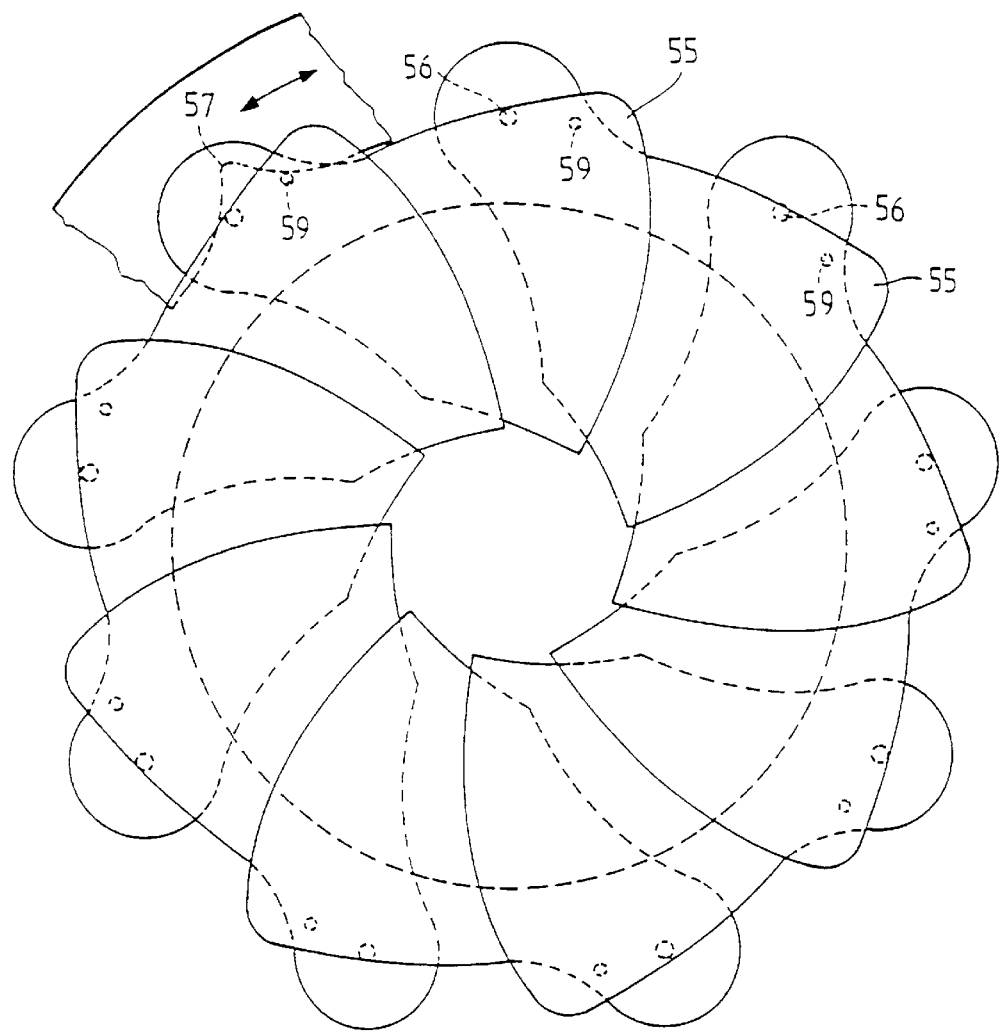
Figure 9:
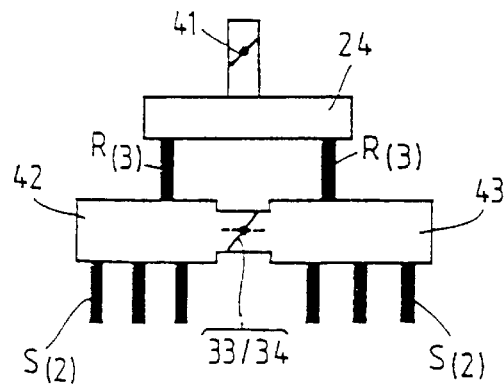
Figure 10:
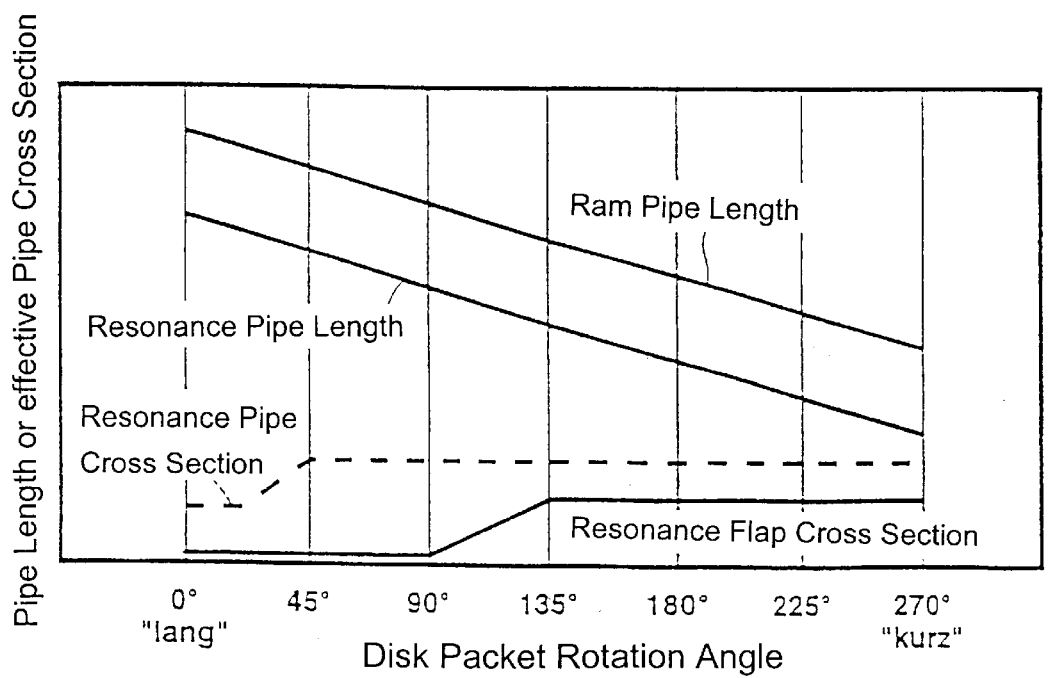
Figure 11:
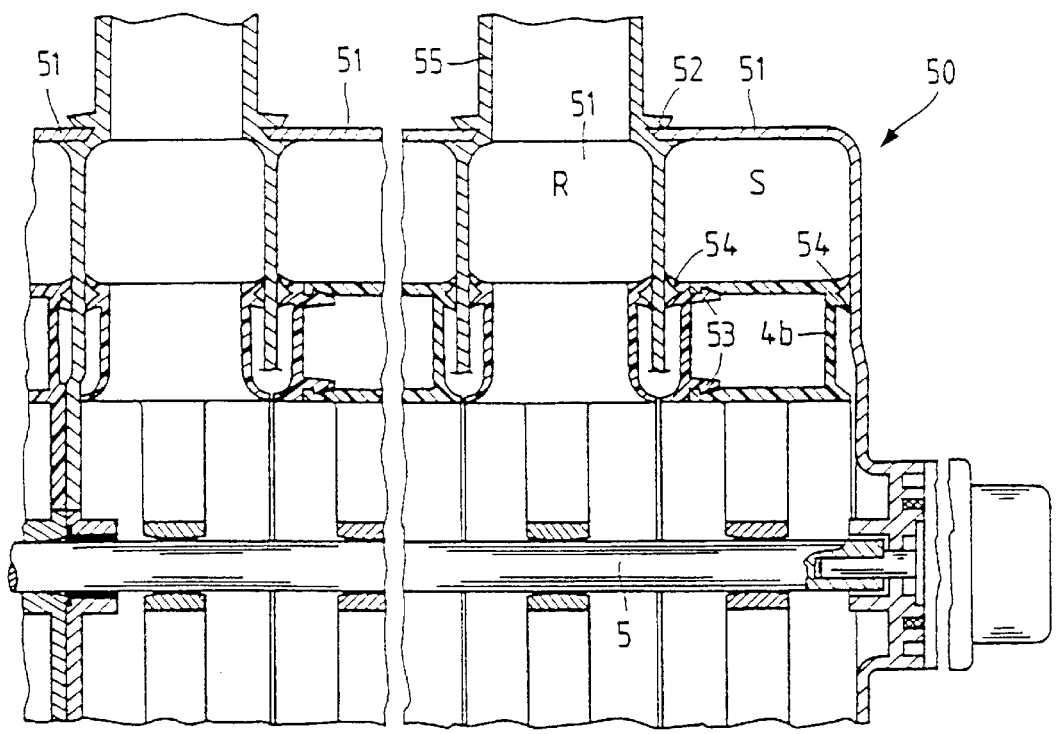

FIGS. 6 and 7 show further embodiments of the changeover disk based on the principle of the iris diaphragm in different switching positions, FIG. 8 is a third embodiment of the changeover disk according to the principle of the iris diaphragm with a plurality of blades, FIG. 9 is a schematic diagram of the adjustable resonance volumes in the induction device, FIG. 10 is a diagram of the resulting lengths and cross sections of the ram and resonance pipes as a function of the rotation angle of the adjustment and changeover disks, and FIG. 11 is a section through an embodiment of the induction device with a housing made up of disks.

DESCRIPTION OF THE EMBODIMENTS

An induction device for an internal combustion engine (not further discussed here) as shown in FIG. 1 has a housing 1, which consists of individual functional areas. The areas labeled S represent ram pipes and the areas labeled R resonance pipes. For an explanation of these areas, see also FIGS. 2 and 3. FIG. 2 shows a section through a ram pipe S along line B—B in FIG. 1, and FIG. 3 a section through a resonance pipe R along line C—C in FIG. 1.

The ram pipe S in the embodiment shown in FIG. 2 is a synthetic resin component comprising an upper housing portion 2, a lower housing portion 3 and a rotatable adjustment disk 4b in its interior. The respective housing portions 2 and 3 are part of the corresponding housing portions of the intake device. The respective adjustment disks 4b of the ram pipes S and the resonance pipes R are arranged on a rotatable shaft 5, as may be seen from FIG. 1. Shaft 5 is supported in two bearing covers 6 and 7 and is driven either directly by an electric motor 8 or by a belt drive 9 and an electric motor 10 as the actuator.

The adjustment disks 4a (FIG. 3) and 4b (FIG. 2) can advantageously be made of synthetic resin material. They can comprise multiple sections, which are combined into a disk, e.g. by snapping, welding, adhesive bonding or the like. A displacement volume in the adjustment disks 4a, 4b along the outer circumference is capable of limiting the volume in the resulting interior resonance volume to a desired maximum volume. The resonance pipes R, which are generally two pipes of a correspondingly larger cross section than the ram pipes, are divided in the embodiment according to the invention for a 6-cylinder engine into 2×2 pipes with a diameter equal to that of the ram pipe. As a result, all the adjustment disks 4a, 4b can be exactly identical, except for the two located on the inside which simultaneously serve as changeover disks, as described in greater detail below.

The adjustment disks 4a, 4b for the resonance pipe R and the ram pipe S on shaft 5 are mounted angularly offset (e.g. by 180°). Transverse seals 29 fitting against the adjustment disks 4a, 4b prevent an otherwise possible short circuit of the airflow at the mounting location of the transverse seal 29. The inner disks (changeover disks) may be designed differently to obtain a larger cross section for the changeover between ram charging and resonance charging, which will be explained in greater detail below.

The entire induction device 1 is thus manufactured with a shell construction, preferably of synthetic resin material, and comprises the two housing portions 2 and 3 and the bearing covers 6 and 7 for the shaft 5, with a further area 11 of the housing portions representing a cover for the belt drive 9, and a cover of a precollector for the intake air being present as described in greater detail below. These housing portions are connected by means of welding, screwing and/or snapping, adhesive bonding, extrusion coating, hot riveting, cold riveting, or clamping, etc. The central shaft 5 is either a through shaft or is divided in the mounting area of the central sheave for the belt drive 9. Shaft 5 is supported at the end faces of the induction device 1 in bearing covers 6 and 7 or in bearings inserted therein. The central bearing seat in the area of the belt drive 9 can also be obtained by solid steel disks instead of thin sealing disks. This steel frame imparts rigidity to the housing of the induction device. The steel disks simultaneously act as fixed reference points with respect to the compensation in length. Tolerances are effective outwardly in both directions starting from the central steel disks.

The function of the induction device will now be described with reference to FIGS. 2 and 3. The adjustment disks 4a (FIG. 3) and 4b (FIG. 2) are rotatable in the direction of arrow 20 through an angle of approximately 270°. They are provided with a peripheral element 22a, 22b arranged on spokes 21a, 21b, which is designed in such a way that it frees at least one connection opening 23a, 23b. The air drawn into the induction device flows through a precollector 24 in the direction of arrow 25 as shown in FIG. 3 and reaches resonance pipe R.

A top view of precollector 24 is shown in FIG. 4. The intake air flows through a throttle valve (not shown here) into inlet 26 of precollector 24.

The intake air then flows through resonance pipe R as shown in FIG. 3 in the direction of arrow 25.1. Through the connection opening 23a it enters centrally into the region of adjustment disk 4a. Then it travels through the common resonance volume in the direction of arrow 25.3 as shown in FIG. 2 through the connection opening 23b and enters the axially adjacent ram pipe S. Thus it reaches the inlet on the cylinder head of the internal combustion engine in the direction of arrow 25.4 at the outlet 28.

In the positions of the adjustment disks 4a and 4b shown in FIGS. 2 and 3, a short intake pipe is thus realized since the air does not have to flow through the entire length of pipes R and S at the outer periphery.

FIG. 5 shows the drive 9 for adjusting the adjustment disks 4a and 4b via sheave 11 and electric motor 10. Drive 9 may be designed so that, in addition, the position of sheave 11 or motor 10 can be detected.

A device for tensioning the drive belt 30 is implemented via rollers 31, or alternatively, as shown in FIG. 5a, via a flexible guide shoe 32. A housing cover 40 of the electric motor 10 in this case simultaneously carries the belt tensioner 31 or 32 and thus simultaneously provides the mount for electric motor 10. This cover 40 may be vibration dampened. The belt tensioning device must take into account the two directions of rotation and can thus be implemented in the form of a unit that tensions belt 30 from the outside on both sides with roller 31 and guide shoe 32, as described. The rotatable support of the belt tensioning unit in housing cover 40 positively influences the action of the device because the return strand is tensioned more if the working strand on its side bends the belt tensioner.

Other actuators also come into consideration as embodiments of electric motor drive 9 or 10. For instance, a stepper motor, possibly with integrated electronic control, or a DC motor with position detection, e.g. via a potentiometer or an incremental encoder. Alternatively to the embodiment depicted, this actuator may also be constructed axle in axle in end to end relation. It can be modularly mountable on the left or right with spur gearing, adjacent to the end face with worm drive, inserted inwardly on the end face, or integrated in the housing cover.

FIG. 5 shows a section along line D—D in FIG. 1 of a device for switching the induction device between resonance charging and ram charging. Shaft 5 has a correspondingly modified adjustment disk with a rotating aperture 33 and a fixed sealing changeover disk with an aperture 34, the function of which will be further explained below.

As may be seen from FIG. 1, adjustment disks 4a, 4b (in this case a total of 10) are also mounted on shaft 5 so as to be locked against rotation, but have a slight play in the bearings so as to compensate any axial run-out. The adjustment disks 4a for the ram pipes S and 4b for the resonance pipes R are alternately mounted side by side and rotate in the same direction. The ram pipes S are spaced apart by the same distance as the cylinders of the connected internal combustion engine. The resonance pipes R are located in the resulting gaps between them. This provides a very compact structure.

Between each of the adjustment disks 4a and 4b, there is a sealing slide disk 35 fixedly mounted in the housing, which is made, for example, of spring steel with an external sealing ring 36 molded onto it. The external resilient sealing ring 36 provides a seal with respect to housing 1 of the induction device, so that a two-part housing with the unavoidable partition joint can be used. The interior region of the spring steel disk 35 acts as a seal and simultaneously as an ideal friction partner of the adjustment disks 4a and 4b. The outer region of the spring steel disk 35 ensures tolerance-compensating decoupling between the seal on the outside and the seal/sliding surface on the inside by means of a corrugated membrane-like impression.

With the above-described drive the adjustment principle described with reference to adjustment disks 4a and 4b as shown in FIGS. 2 and 3 for changing the ram and resonance pipe lengths and cross-sections can be carried out as a function of the adjusting angle by a rotation of shaft 5. As previously mentioned, the adjustment disks 4a and 4b in the figures are shown in their short position. The adjustment disks 4a and 4b can be rotated clockwise by about 270°. Since in this case one and the same drive 9 executes all the adjustments, the sizes cannot be adjusted independently from one another in a fixed geometry. The interplay of the individual changes must already be taken into account in the design.

In a departure from the concept depicted here, it is also possible to use a separate actuator to switch between ram and resonance charging as described with reference to FIG. 5 or to change the resonance pipe cross section. Inserting freewheels and springs makes it possible functionally to decouple, for example, resonance pipe adjustment disks 4b and ram pipe adjustment disks 4a.

FIG. 5 illustrates ram charging when both resonance volumes 42 and 43 act almost like a single resonance volume due to the opening of the connecting cross-section of apertures 33 and 34. Resonance charging occurs if the connecting cross section is closed. The changeover is effected by means of the adjustment disks and the sealing changeover disks described with reference to FIG. 5, which can be rotated in relation to one another and of which one is fixed within the housing, i.e. it does not rotate. The other can be fixed in relation to the adjustment disks 4a and 4b or decoupled by means of a freewheel, spring or the like so that the maximum rotation angle of these disks is not equal to that of the adjustment disks. (In this case larger aperture cross sections may be realized). The connecting cross section between the resonance volumes 42 and 43 is open when the apertures 33 [sic] and 34 overlap in the two changeover disks, otherwise it is closed.

The geometry of the apertures as shown in FIG. 5 can be used to design the opening characteristics (in this case the opening cross section between the resonance volumes 42 and 43 above the angle of rotation). In 6-cylinder engines the cross section should be at least 1.5 to 2.0 times as large as that of the ram pipe cross-section. As an alternative thereto, it is also possible to use a solution based on the principle of a camera lens with an iris diaphragm, as shown in FIGS. 6, 7 and 8. In FIGS. 6 and 7, sword-shaped blades 50 are rotated about an axis 51 into the plane of aperture 52. These blades 50 can either unblock or tightly seal aperture 52. They can be controlled by means of a cam 53 on blade 50 and a guide through the sealing changeover disk 54, which is fixed in relation to the adjustment disk. Guidance can be fully assumed by the sealing changeover disk 54—no return springs, etc. are necessary.

FIG. 6 shows the open position and FIG. 7 the closed position.

FIG. 8 shows a third variant which is a modification of the embodiment according to FIGS. 6 and 7. In this case, a number of blades 55 are arranged in such a way that they can respectively be displaced about a pivot 56 so that a variable iris diaphragm results. In this case, blades 55 are guided about pivot 56, for instance, by means of an internally toothed ring 57 (shown here only in part) acting against corresponding cams on the blades, similarly to the method discussed with reference to FIGS. 6 and 7.

FIG. 9 schematically shows how the intake air reaches the precollector 24 through a throttle valve 41, then flows through resonance pipes R, which are adjustable both in length and cross section, into a resonance volume 42 and 43 and then into the ram pipes S, which are connected to the cylinder inlets. The two resonance volumes 42 and 43 can be connected or separated via apertures 33 and 34 illustrated, by way of example, in FIG. 5. This causes switching between resonance charging and ram charging in the induction device.

The sealing of the individual ram pipes and resonance pipes R and S relative to one another and of ram pipes S with respect to the resonance volumes 42, 43 is important in the invention for the functioning of the intake pipe. The seal 36 (cf. FIG. 1) along the outer circumference of the sealing disks 35 provides, in particular, sealing between the ram pipes S at the joint location of the housing covers 2 and 3. The seal between the ram pipe S and the resonance volume is provided along a friction surface 37 between the spring steel of sealing disk 35 and the respective adjustment disk 4a, 4b.

The adjustment disk packets of the left and right half of the induction device 1 are urged together by means of springs. The strength of the spring bias has to be determined experimentally. It must be just large enough that the disks fit tightly enough against one another, but friction remains nevertheless low enough to keep the required driving power as low as possible. The spring tension should not fluctuate too much in case of length tolerances in the disk packets (small spring constant). The springs 38 and 39 are located at the end faces of the bearing covers 6 and 7.

FIG. 10 shows a diagram of the changes in the geometry of the induction device 1 as a function of the angle of rotation of the driven shaft 5. The ram pipe length is the shortest path of the pipe cross section centerline from the resonance volume up to the intake valve of the internal combustion engine behind the outlet 28 of the ram pipe S according to FIG. 2. It is shortened by rotating the adjustment disks 4b (advantageously, e.g., at high engine speeds) or lengthened (advantageously, e.g., at low engine speeds). The dead branches branching off in short positions, i.e., pipe segments where there is no flow, may be covered, if necessary, by tongues (not shown) mounted on the adjustment disks 4b. The ram pipe length is also adjusted when there actually should be resonance charging since the rotation is coupled together. In this case, however, the influence of this adjustment is of little importance compared to the resonance pipe geometry.

The resonance pipe length is the shortest path of the pipe cross section centerline of pipe R from the precollector 24 up to the opening into the resonance volume after the connection aperture 23a as shown in FIG. 3. It is shortened by rotating the adjustment disk 4a (advantageously, for example, at high engine speeds) or lengthened (advantageously, for instance, at low engine speeds). The dead branches branching off in short positions may again be covered, if necessary, by tongues mounted on the adjustment disks 4a. The resonance pipe length is also adjusted when there actually should be ram charging since the rotation is coupled together. In this case, however, the influence of the adjustment is of minor importance compared to the ram pipe geometry.

The resonance pipe cross section is the sum of all pipe cross sections that connect the precollector 24 and a resonance volume, as described above. In the case of a 6-cylinder internal combustion engine there are thus 2×2 resonance pipes. One of them can advantageously be closed at low engine speeds to reduce the cross section. This is easiest to accomplish by means of an appropriate channel geometry of the resonance pipe R in the respective housing half 2 according to FIG. 3. In the long resonance pipe position, the opening of a resonance pipe into the resonance volume is sealed on one side of the induction device because it is covered by the wall of housing half 2 at a point 27. Alternatively, insert parts are feasible, which prevent the flow through the resonance pipe R at certain positions of the adjustment disk 4a (in the long position).

As an alternative, an embodiment according to FIG. 11 shows a housing 50 of an induction device, which in its essential functions corresponds to the above-described embodiments, but instead of a two part housing consisting of an upper and lower part has a housing 50 composed of disks 51. The housing disks 51, which thus extend perpendicularly to shaft 5, form the resonance pipes R and the ram pipes S, respectively, and are assembled against one another in sealed relation at a joint position 52 and connected together. Within the pipes R and S are arranged the respective adjustment disks 4a and 4b, described with reference to FIGS. 2 and 3, which are also constructed of shells and are joined together at a joint position 53.

Along their circumference, the adjustment disks 4a and 4b according to FIG. 11 each have sealing lips 54 that glide along the respective disk wall as the adjustment disks 4a and 4b are rotated, but nevertheless ensure a seal for the intake flow. The section depicted in FIG. 11 further shows a pipe branch or pipe section 55 for coupling resonance pipe R to the inflow path or the precollector. This pipe section 55 can be integrally fabricated with each housing disk 51.

What is claimed is:

1. An induction device for an internal combustion engine with an intake duct comprising at least one resonance pipe connected via a resonance volume with at least one ram pipe; wherein said induction device is switchable to effect ram charging or resonance charging in the intake duct, and wherein the at least one ram pipe and the at least one resonance pipe have geometries which are adjustable within predetermined limits, wherein said device comprises a number of resonance pipes corresponding to the number of cylinders of the internal combustion engine, and an equal number of ram pipes located alternately between the resonance pipes, a rotatable adjustment disk arranged in each of the resonance pipes for continuously varying the effective length of the resonance pipe from a precollector up to the resonance volume, and a rotatable adjustment disk arranged in each ram pipe for continuously varying the effective length of the ram pipe from the resonance volume up to a cylinder inlet of the internal combustion engine, and wherein said adjusting disks are mounted on a motor driven central support shaft for rotation therewith.

2. An induction device as claimed in claim 1, wherein the at least one ram pipe and the at least one resonance pipe have lengths which are/is continuously variable.

3. An induction device as claimed in claim 1, wherein the adjustment disks in the resonance pipes and the adjustment disks in the ram pipes are mechanically coupled with one another and rotate together to either increase or decrease the effective lengths of both the resonance pipes and the ram pipes, depending on the direction of rotation.

4. An induction device as claimed in claim 1, further comprising a resonance switch in said resonance volume which, when closed, divides the resonance volume into two resonance chambers for resonance charging, and, when opened, connects the two resonance chambers for ram charging, and wherein an equal number of resonance pipes and of ram pipes communicate with said resonance volume on either side of said resonance switch.

5. An induction device as claimed in claim 4, further comprising a regulating motor which both rotates the adjustment disks and actuates the resonance switch.

6. An induction device as claimed in claim 5, wherein said regulating motor drives said central shaft to rotate the adjustment disks and actuate the resonance switch.

7. An induction device as claimed in claim 6, wherein the resonance switch comprises a fixed sealing changeover disk having an aperture therethrough, and an adjacent, modified adjustment disk having an aperture therethrough, said modified adjustment disk being rotated by said shaft so that the aperture therethrough rotates into and out of alignment with the aperture through the changeover disk to open and close the resonance switch.

8. An induction device as claimed in claim 6, wherein the resonance switch comprises a fixed sealing changeover disk having an aperture therethrough, and an adjustable iris diaphragm with at least one blade movable over or away from the aperture through the changeover disk to open and close the resonance switch.

9. An induction device as claimed in claim 1, wherein resonance charging is realized in the induction device in all operating states of the internal combustion engine, and wherein the resonance pipes and the ram pipes are designed such that the resonance pipe lengths and the ram pipe lengths can be lengthened or shortened by different amounts if there is a change in engine speed.

10. An induction device as claimed in claim 9, wherein the different lengths of the resonance pipes and the ram pipes are realized by respective adjustment disks of different diameters, and wherein the induction device has a housing with a correspondingly reduced diameter in regions with smaller diameter adjustment disks while preserving the pipe cross section.

11. An induction device as claimed in claim 1, wherein the resonance pipes are formed between the adjustment disks and channel walls formed in a housing surrounding the adjustment disks, and a stepped cross section adjustment of at least one resonance pipe is realized by a constriction of the channel wall in a predefined region of the respective resonance pipe.

12. An induction device as claimed in claim 1, wherein the resonance pipes are formed between the adjustment disks and channel walls formed in a housing surrounding the adjustment disks, and a stepped cross section adjustment of at least one resonance pipe is realized by a displaceable wall in the channel of the respective resonance pipe.

13. An induction device as claimed in claim 1, wherein the drive motor is a stepper motor with integrated position control or a DC motor with a rotational position detector.

14. An induction device as claimed in claim 1, wherein the shaft is driven by a belt drive, further comprising a belt tensioner designed to maintain belt tension when the belt is driven in either direction.

15. An induction device as claimed in claim 1, wherein the ram pipes and the resonance pipes are sealed with respect to one another by sealing disks made of spring steel, which abut a friction surface between adjacent adjustment disks, and which have a resilient seal contacting a surrounding housing.

16. An induction device as claimed in claim 1, wherein the ram pipes and the resonance pipes are sealed with respect to one another by sealing disks made of synthetic resin material, which abut a friction surface between adjacent adjustment disks, and which have a resilient seal contacting a surrounding housing.

17. An induction device as claimed in claim 1, wherein the induction device comprises a housing comprised of a series of abutting, axially aligned, annular housing disks, wherein each resonance pipe and each ram pipe is formed between the exterior of an adjusting disk and the interior of a surrounding annular housing disk.

18. An induction device as claimed in claim 17, wherein the induction device is preassembled by coaxially aligning the housing disks, the adjustment disks, and the drive, and thereafter producing a sealed connection between adjacent housing disks.

19. An induction device as claimed in claim 1, wherein the ram pipes and the resonance pipes are sealed with respect to one another by sealing disks which protrude between adjacent adjustment disks, and wherein sealing lips are arranged on the adjustment disks, said sealing lips providing a seal between the adjustment disks and the protruding sealing disks.

\* \* \* \* \*